US009963273B2

(12) United States Patent
Hortig et al.

(10) Patent No.: US 9,963,273 B2
(45) Date of Patent: May 8, 2018

(54) FILM BAG FOR STORING A FLUID AND DEVICE FOR PROVIDING A FLUID

(71) Applicant: Robert Bosch GmbH, Stuttgart (DE)

(72) Inventors: Michael Hortig, Eningen U. A. (DE); Yvonne Beyl, Gerlingen (DE); Daniel Czurratis, Korntal-Münchingen (DE); Sven Zinober, Friolzheim (DE); Lars Sodan, Balingen (DE); Martina Daub, Weissach (DE); Jochen Rupp, Stuttgart (DE); Holger Behrens, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 322 days.

(21) Appl. No.: 14/651,605

(22) PCT Filed: Dec. 2, 2013

(86) PCT No.: PCT/EP2013/075200
§ 371 (c)(1),
(2) Date: Jun. 11, 2015

(87) PCT Pub. No.: WO2014/090610
PCT Pub. Date: Jun. 19, 2014

(65) Prior Publication Data

US 2015/0314924 A1 Nov. 5, 2015

(30) Foreign Application Priority Data

Dec. 11, 2012 (DE) ........................ 10 2012 222 719

(51) Int. Cl.
*B65D 35/28* (2006.01)
*B65D 47/36* (2006.01)
(Continued)

(52) U.S. Cl.
CPC ........ *B65D 35/28* (2013.01); *B01L 3/502715* (2013.01); *B01L 3/523* (2013.01);
(Continued)

(58) Field of Classification Search
None
See application file for complete search history.

(56) References Cited

U.S. PATENT DOCUMENTS 2,756,875 A 7/1956 Yochim
2,971,850 A 2/1961 Barton
(Continued)

FOREIGN PATENT DOCUMENTS

CN 1802298 A 7/2006
CN 101262948 A 9/2008
(Continued)

OTHER PUBLICATIONS

International Search Report corresponding to PCT Application No. PCT/EP2013/075200, dated Feb. 19, 2014 (German and English language document) (7 pages).

*Primary Examiner* — Jill A Warden
*Assistant Examiner* — Julie L Tavares
(74) *Attorney, Agent, or Firm* — Maginot, Moore & Beck LLP

(57) ABSTRACT

A film bag for storing a fluid, in particular a reagent or an auxiliary agent for a biochemical analysis method, includes a film, a seam, and an irreversibly destructible predetermined breaking point. The film is impermeable to the fluid and constituents of the fluid. The seam is formed in a fluid-tight manner between a first sub-region of the film and a second sub-region of the film and forms the film into a fluid-tight bag for accommodating the fluid. The bag is configured to be arranged in a chamber of a device that provides a fluid for a biochemical evaluating unit. The predetermined breaking point is formed from the film and is fluid-tight when a fluid pressure in the film bag is below a limit. The predetermined breaking point is destroyed when the fluid pressure is above the limit.

10 Claims, 9 Drawing Sheets

(51) Int. Cl.

| | |
|---|---|
| ***B65D 33/01*** | (2006.01) |
| ***B65D 33/02*** | (2006.01) |
| ***B65D 35/10*** | (2006.01) |
| ***B65D 35/56*** | (2006.01) |
| ***B01L 3/00*** | (2006.01) |

(52) U.S. Cl.

CPC ............. *B65D 33/01* (2013.01); *B65D 33/02* (2013.01); *B65D 35/10* (2013.01); *B65D 35/56* (2013.01); *B65D 47/36* (2013.01); *B01L 2200/0689* (2013.01); *B01L 2200/16* (2013.01); *B01L 2300/0816* (2013.01); *B01L 2300/0887* (2013.01); *B01L 2300/123* (2013.01); *B01L 2400/0481* (2013.01); *B01L 2400/0683* (2013.01)

(56) References Cited

U.S. PATENT DOCUMENTS

| | | | | |
|---|---|---|---|---|
| 3,809,224 | A | 5/1974 | Greenwood | |
| 4,932,155 | A | 6/1990 | Friemel et al. | |
| 2006/0275852 | A1 | 12/2006 | Montagu et al. | |
| 2008/0050830 | A1 | 2/2008 | Floriano et al. | |
| 2008/0097285 | A1* | 4/2008 | Scampini ................. | G01N 1/36 604/30 |
| 2010/0308051 | A1 | 12/2010 | Weber | |

FOREIGN PATENT DOCUMENTS

| | | | |
|---|---|---|---|
| CN | 102105227 | A | 6/2011 |
| DE | 10 2007 059 533 | A1 | 6/2009 |
| DE | 10 2009 045 685 | A1 | 4/2011 |
| DE | 10 2010 042 740 | A1 | 4/2012 |
| JP | 2003-12033 | A | 1/2003 |
| JP | 2004-308691 | A | 11/2004 |
| WO | 2009/152952 | A1 | 12/2009 |

* cited by examiner

FILM BAG FOR STORING A FLUID AND DEVICE FOR PROVIDING A FLUID

This application is a 35 U.S.C. § 371 National Stage Application of PCT/EP2013/075200, filed on Dec. 2, 2013, which claims the benefit of priority to Serial No. DE 10 2012 222 719.9, filed on Dec. 11, 2012 in Germany, the disclosures of which are incorporated herein by reference in their entirety.

BACKGROUND

The present disclosure relates to a film bag for storing a fluid, to a device for providing a fluid for a biochemical evaluation unit, to a system for providing a fluid as well as to a method for opening a fluid-filled film bag, to a method for producing a fluid-filled film bag as well as to a method for producing a system for providing a fluid.

In order to produce analysis systems that are simple to handle and are available at cost-effective prices in the area of medical technology or environmental analysis, compact units are often already provided in which the reagents that are required for a certain analysis reaction are already provided in said unit.

DE 10 2009 045 685 A1, for example, describes a microfluidic chip which comprises a distensible diaphragm which is distensible into a liquid reservoir, with volume displacement, in order to move a liquid out of the liquid reservoir through a liquid channel inlet into a liquid channel of the microfluidic chip.

SUMMARY

Against said background, the present disclosure puts forward a film bag for storing a fluid, a device for providing a fluid for a biochemical evaluation unit, a system for providing a fluid, a method for opening a fluid-filled film bag and a method for producing a fluid-filled film bag as well as finally a method for producing a system for providing a fluid. Advantageous developments are produced from the respective sub-claims and the following description.

Plastics materials, depending on the type, can be permeable to certain substances whilst they are impermeable to other substances. When different substances are stored in one unit produced from plastics material with several directly adjacent chambers, easily volatile substances can diffuse through the plastics material and evaporate or contaminate other substances stored in adjacent chambers.

In order to exclude contamination as a result of diffusing substances in the case of reagents and auxiliary agents inside a unit of a biochemical analysis method, the reagents and auxiliary agents can be stored pre-portioned in diffusion-tight receptacles and said receptacles can only be opened automatically (or where necessary manually) directly prior to use and the reagents and auxiliary agents transferred into an analysis region. The reagents and auxiliary agents remain in the analysis region for the duration of the analysis method. The entire unit can then be disposed of. In particular, easily volatile reagents (such as, for example, alcohol) and auxiliary agents can be stored in diffusion-tight receptacles. Such a diffusion-tight receptacle can be, for example, a diffusion-tight film bag with a predetermined breaking point which is opened in response to a transfer instruction or a mechanical action such that the reagent and/or the auxiliary agent is/are able to flow into the analysis region. The film bag can be stored inside the unit. The film bag can also be stored separately from the unit as a contiguous set of different reagents and/or auxiliary agents and can be inserted into the unit directly prior to carrying out an (analysis) method.

A film bag for storing a fluid, in particular a reagent or an auxiliary agent for a biochemical analysis method, comprises the following features:

a film which is impermeable to the fluid and constituents of the fluid;

a seam between a first part region of the film and a second part region of the film, wherein the seam is realized in a fluid-tight manner and the film forms into a fluid-tight bag for receiving the fluid, wherein the bag is realized for the purpose of being arranged in a chamber of a device for providing a fluid for a biochemical evaluation unit; and a defined irreversibly destructible predefined breaking point which is realized from the film and is fluid-tight when a fluid pressure in the film bag is less than a limit value, and which is destroyed when the fluid pressure is greater than the limit value.

A device for providing a fluid for a biochemical evaluation unit comprises the following features:

a chamber for receiving a film bag for storing a fluid, wherein the chamber comprises an interface for providing the fluid for the evaluation unit; and a device for opening a predetermined breaking point of the film bag in order to provide the fluid at the interface.

A system for providing a fluid for a biochemical evaluation unit comprises the following features:

at least one device for providing according to the approach put forward here; and at least one film bag for storing according to the approach put forward here per device, wherein the film bag is arranged in the chamber of the device, and the chamber is closed.

A fluid can be understood in particular as a liquid such as, for example, alcohol in a form (i.e. for example a concentration of more than 80%). The fluid can be incompressible. A film can comprise a minimal thickness of, for example, between 10 and 100 μm. A biochemical analysis method can run, for example, in an assay or be a reaction sequence to prove a substance in a sample. The biochemical analysis method can be used, in particular, in infection diagnostics. A seam can be a connecting point. In particular, the seam can be a welding seam or an adhesive seam. Two pieces or part regions of the film can be connected together in the region of the seam. For example, when the seam is produced a material of the films can be plasticized in the region of the seam and the material joined under pressure. For example, the film can be folded and formed and/or closed with a circumferential seam to form a bag. Likewise, two non-contiguous films can be formed into a bag with a closed seam that runs around in a ring-shaped manner. The film can also be provided in a tubular manner in order to realize the bag with a seam at the first end and a further seam on a second end that is located opposite the first end. A bag can be completely closed when it is filled with the fluid. The bag can comprise a fill opening. For example, the seam can comprise an interruption that is only closed when the bag has been filled with fluid. The seam can be realized or executed in different production steps. The bag can also be understood as a closed pocket. For example, a first seam can be produced first of all in order to produce the pocket, the pocket can then be filled with the fluid and a second seam can then close the pocket in a fluid-tight manner in order to produce the bag. The seam can be realized in a contoured manner. For example, a subsequent outside contour of the film bag can be defined by means of a contour of the seam. The film can project beyond the seam and be cut outside the seam or the film can be cut in the region of the seam. The film can also be uncut, for example in order to realize adjacent the bag at least one further bag which can be arranged in at least one adjacent chamber of the device. The seam can comprise different seam regions. For example, several parallel sealing lines can be arranged next to one another analogous to welding beads. In this case, one or several sealing lines can provide for the fluid tightness of the filled fluid bag. One of the sealing lines can realize a cut edge through the two interconnected films.

A chamber can be an indentation in a basic body which is closable in a fluid-tight manner by means of a cover. The film bag can comprise, in the filled state, a form which corresponds to a form of the chamber or is smaller than the chamber in order to be placed into the chamber. A defined predetermined breaking point can be a predefined region of the film which is able to receive smaller forces than the rest of the film bag. As a result, the predetermined breaking point can already be destroyed whilst the rest of the bag is still structurally intact. The forces in the film can be, for example, tensile forces on account of a fluid pressure in the film bag. For example, the film can comprise a notch at the predetermined breaking point. Likewise, the film can be thinner at the predetermined breaking point than in the rest of the bag. A device for opening the predetermined breaking point can be, for example, a movable punch which is pressed into the chamber for opening the fluid bag. The device for opening can also comprise a sharp edge for opening the predetermined breaking point, it being possible for the sharp edge to be pressed into the predetermined breaking point in response to the actuating.

According to a specific embodiment of the present disclosure, the film bag can be filled with a fluid, in particular with alcohol. According to a specific embodiment of the present disclosure, the fluid can comprise an alcohol concentration in excess of 80%. Such an embodiment of the present disclosure provides the advantage of preliminarily storing the fluid in a particularly secure and leak-free manner up to release of the fluid, in particular the alcohol, at a moment when the fluid is required, for example, for a specific function.

The film can comprise a multiple-layered design. The film can comprise, in particular, an at least three-layered design, a central layer being realized as a metal film or including a metal film. A multiple-layered design can comprise at least two layers produced from different material which are fixedly joined together. In particular, the individual layers can be melted, bonded or laminated together. The materials of the individual layers can be in each case impermeable to certain components. When one of the materials is permeable to one or several substances, the other layers can be impermeable to the one substance or the several substances. A three-layered design can consist of a first layer of a first material, a second layer of a second material and a third layer of a third material. The first material can be the same material as the third material. An outside layer of the first part region can be connected, for example, to an outside layer of the second part region in the seam. The outside layers can be squeezed together in the seam to form a predetermined material strength.

The predetermined breaking point can be realized as a portion of the seam. The seam can have less strength in the predetermined breaking point than outside the predetermined breaking point. The seam can comprise, for example, a smaller width in the predetermined breaking point than outside the predetermined breaking point. For example, the seam can comprises fewer sealing lines there than outside the predetermined breaking point. The production of the film bag can be simplified as a result of integrating the predetermined breaking point into the seam.

The seam can comprise at least one V-shaped characteristic in the region of the predetermined breaking point. A V-shaped characteristic can produce a notch effect, proceeding from which a break in the predetermined breaking point can be effected. A position at which the fluid is to be pressed out of the bag can be determined as a result.

The seam can be folded around and/or bent around in the direction of a center of the bag. The seam can be folded around at least in a part region of the seam. The strength of the seam can be increased as a result of folding the seam around. For example, the seam or the bent-around part of the seam can be fixed on the bag. It can be ensured as a result of the folding around that the fluid is not pressed out of the bag at the folded-around point.

A further seam can be arranged at least in a part region of the seam next to the seam, in the direction of a center of the bag, in order to reduce a volume that is surrounded by the bag. When the bag is filled with the fluid and is closed in a fluid-tight manner by the seam, there can be a follow-up in a part region of the seam in order to apply the further seam further inside as the seam (i.e. in the direction of the center of the fluid bag). In this case, the bag can become firmer than without the further seam as the fluid can only be dispensed at great effort under pressure, for example under vacuum. When the bag is firmer, the fluid can already be subject to excess pressure. As a result, only a little additional pressure is required to make the fluid bag burst at the predetermined breaking point.

The film bag can comprise an additional element which is fastened on a film continuation of the film that is realized as a bend point, wherein the film continuation is arranged on a side of the seam that is remote from the center of the bag, wherein the additional element is realized for the purpose of being bent and/or pressed onto the bag in order to concentrate and/or increase a pressure onto the bag. A film continuation can be film which is formed to be protruding beyond the seam when the film bag is produced. The additional element can be an element which is more rigid or stiffer than the bag and, in the state bent onto the bag, is realized for the purpose of receiving force on a larger surface that is remote from the bag, and to discharge it to the bag on a smaller contact surface that faces the bag. In this case, the inside pressure in the bag can be increased in order to allow the bag to burst reliably at the predetermined breaking point. The additional element can be a structural component in order to strengthen the film bag. The additional element can be clamped, bonded or welded to the film continuation. The additional element can also consist of strengthened film.

The additional element can comprise a continuation which protrudes on a side located opposite the bend point out of a main extension plane of the additional element and is realized for the purpose of surrounding the predetermined breaking point at least in part when the additional element is bent onto the bag. A continuation can be a structural element which is realized for the purpose of acting as a depth stop when the additional element is pressed onto the bag. The continuation can allow the pressure to act on the predetermined breaking point in a time-delayed manner.

As a result, one side of the additional element that is located opposite the continuation can be pressed harder onto the bag in order to press or squeeze the fluid in the bag to the predetermined breaking point. As a result, it can be ensured that the predetermined breaking point remains open and the fluid is able to escape. When a predetermined minimum force acts on the additional element, the continuation can yield or fail so that the bag is able to be completely drained.

The device for opening can comprise a fluid-tight diaphragm which is arranged at least in part inside the chamber, and is deformable as a result of an actuating force and is realized in order to bring about volume a reduction in the volume of the chamber and to press the fluid out of the film bag to the interface at the predetermined breaking point. A diaphragm can consist, for example, of a plastics material. An actuating force can be provided, for example, by an air pressure pulse. The diaphragm can be pressed into the chamber by the actuating force. In this case, the diaphragm can be pressed onto the film bag on one side in order to make the film bag burst.

The chamber, on a side that is remote from the device for opening or opposite it, can comprise an indentation as a drainage region for the fluid and/or for improving the opening procedure of the predetermined breaking point. The interface can be arranged in the indentation. The indentation can be arranged on the side that is located opposite the device for opening. The indentation can be realized by a step in the bottom of the chamber. The predetermined breaking point can be arranged in the region of the indentation. As a result of the indentation, the film bag can be uncovered in the region of the indentation such that when the device for opening is actuated, a pressure gradient is set between a part of the film bag that is located opposite the predetermined breaking point and a part of the film bag that is located in the region of the predetermined breaking point, which is able to make the predetermined breaking point burst. As a result of the indentation, the film bag can be drained of all residue. Likewise, as a result of the indentation, the necessary opening pressure can be reduced at the predetermined breaking point on account of the more favorable angle of the film.

The device for opening can comprise a pressure plate which is arranged so as to be movable inside the chamber and is realized for the purpose of pressing the film bag flat between the pressure plate and a bottom of the chamber when the device for opening is actuated. A pressure plate can be a rigid disk which distributes the pressing force over a large part of the film bag. The pressure plate can compress the film bag in an even manner. As a result, the film bag can be drained of all residue.

The pressure plate can be fastened on the device for opening. For example, the pressure plate can be bonded or welded onto the diaphragm. As a result of the pressure plate being placed in the chamber, the fluid can be pressed out of the film bag particularly well.

The pressure plate can be realized in a smaller manner as the pressure plate is no longer movable when being conveyed and consequently there is less risk of damaging the film bag.

The pressure plate can comprise a continuation which protrudes on one side from a main extension plane of the pressure plate and is realized for the purpose of surrounding or engaging behind the predetermined breaking point at least in part. A continuation can be a structural element which is realized for the purpose of acting as a depth stop when the pressure plate is pressed onto the bag. The continuation can allow the pressure to act on the predetermined breaking point in a time-delayed manner. As a result, one side of the pressure plate located opposite the continuation can be pressed harder onto the bag in order to press or squeeze the fluid in the bag to the predetermined breaking point. As a result, it can be ensured that the predetermined breaking point remains open and the fluid is able to escape. When a predetermined minimum force acts on the pressure plate, the continuation can yield or fail so that the bag is able to be completely drained.

The device for opening can be arranged in a movable cover of the chamber which is realized for the purpose of closing the chamber in a fluid-tight manner. The film bag can be inserted in a particularly simple manner into the chamber through an open cover. When the film bag is in the chamber, the chamber can be closed in a fluid-tight manner. For example, the cover can be welded on. Likewise, the cover can be latched in place. As a result of the arrangement of the device for opening in the cover, the cover can be realized, for example, in multiple parts and the device for opening enhanced when the cover is assembled or when the cover is closed.

The film bag can be arranged eccentrically in the chamber and at least a part region of the seam can be bent around by a wall of the chamber or can contact the wall of the chamber. The film bag can be arranged so close to the wall that the seam, for example, is bent in the direction of the device for opening. As a result of bending the seam around by means of the wall, it is no longer necessary to bend the seam around when producing the film bag. The seam can withstand a larger load in the bent-around region as a result of the bending around. As a result, the film bag is able to open reliably at the predetermined breaking point.

A method for opening a fluid-filled film bag comprises the following step:

applying a force onto a part region of the film bag in order to increase an inside pressure of the film bag in relation to an atmospheric pressure until a predetermined breaking point of the film bag tears in order to open the film bag.

A method for producing a fluid-filled film bag comprises the following steps:

preparing a film bag for storing a fluid, wherein the bag comprises a fill opening, wherein the fluid bag comprises a film which is impermeable to the fluid and constituents of the fluid;

filling the bag with the fluid through the fill opening; and closing the fill opening of the film bag by way of a seam in order to seal the film bag, wherein the seam is applied between a first part region of the film and a second part region of the film, wherein the seam is realized so as to be fluid-tight and the film forms into a fluid-tight bag for receiving the fluid, wherein the bag is realized for the purpose of being arranged in a chamber of a device for providing a fluid for a biochemical evaluation unit and wherein in the step of closing, an irreversibly destructible predetermined breaking point is realized which is realized from the film and is fluid-tight when a fluid pressure in the film bag is less than a limit value, and which is destroyed when the fluid pressure is greater than the limit value.

A fill opening can be a non-closed seam of the film bag. The fill opening can also be an additional opening into the bag of the film bag which is closable in a fluid-tight manner.

In addition, a method for producing a system for providing a fluid for a biochemical evaluation unit is proposed here, wherein the method comprises the following steps:

providing a fluid bag according to an embodiment and a device put forward here for providing a fluid for a biochemical evaluation unit;

moving the fluid bag into the chamber of the device; and closing the device in order to produce the system for providing the fluid for a biochemical evaluation unit.

Also advantageous is a computer program product with a program code which can be stored on a machine-readable carrier such as a semiconductor memory device, a hard drive memory or an optical memory and is used to activate a device according to one of the above-described embodiments when the program product is executed on a computer or a device.

BRIEF DESCRIPTION OF DRAWINGS

The disclosure is explained in more detail below as an example by way of the accompanying drawings, in which.

DETAILED DESCRIPTION

In the following description of preferred exemplary embodiments of the present disclosure, identical or similar references are used for the similarly acting elements shown in the various figures, repeated description of said elements being omitted.

Figure 1:
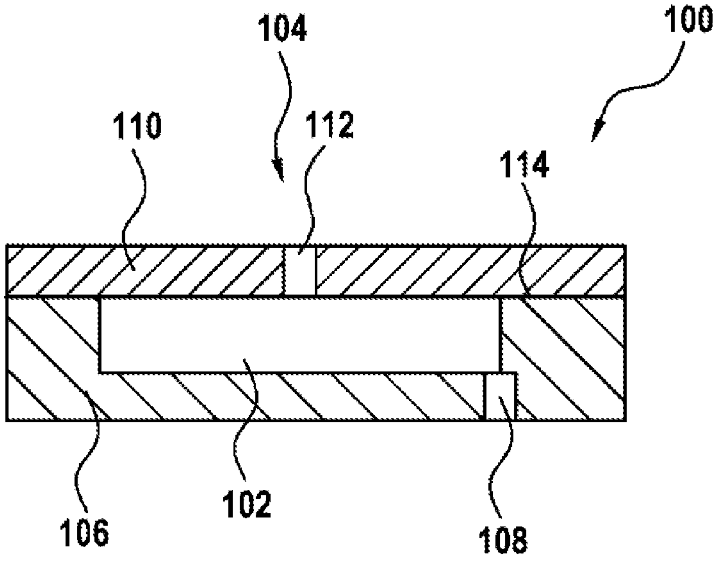
FIG. 1 shows a representation of a device for providing a fluid for a biochemical evaluation unit according to an exemplary embodiment of the present disclosure.

FIG. 1 shows a representation of a device 100 for providing a fluid for a biochemical evaluation unit according to an exemplary embodiment of the present disclosure. The device 100 comprises a chamber 102 and a device for opening 104. The chamber 102 is realized as an indentation or as an insert form in a basic body 106. The chamber 102 is realized for the purpose of receiving a film bag for storing the fluid. The chamber 102 comprises a smaller depth than width. An interface 108 for providing the fluid for the evaluation unit is arranged in a bottom of the chamber 102. The interface 108 is realized as an outlet channel. The chamber 102 is covered by a cover 110. The cover 110 forms the device for opening 104 a predetermined breaking point of the film bag. In said exemplary embodiment, the cover 110 is breached by an air channel 112. A fluid-tight diaphragm 114, for example produced from TPE, is arranged between the cover 110 and the basic body 106. The diaphragm 114 is deformable and, when the device for opening 104 is actuated, can be deformed by means of compressed air flowing in through the air channel into the chamber 102 in order to provide the fluid at the interface 108.

Figure 2:
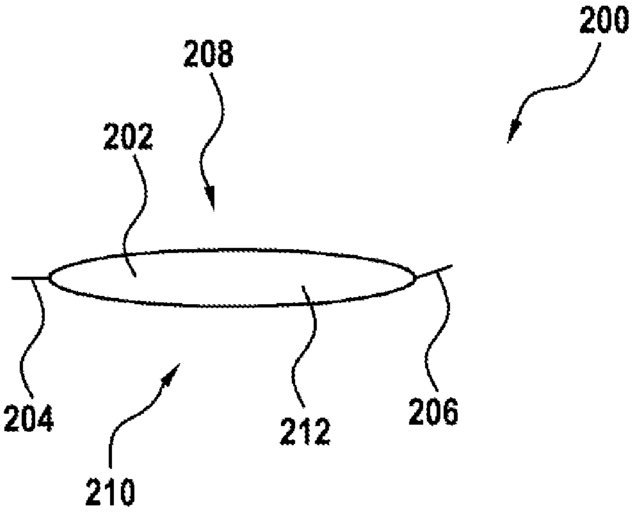
FIG. 2 shows a representation of a film bag for storing a fluid according to an exemplary embodiment of the present disclosure.

FIG. 2 shows a representation of a film bag 200 for storing a fluid according to an exemplary embodiment of the present disclosure. The film bag 200 or the tubular bag 200 is realized in particular for the purpose of storing a reagent or an auxiliary agent for a biochemical analysis method. The film bag 200 comprises a film 202, a seam 204 and a predetermined breaking point 206. The film bag 200 is shown filled with fluid. The film 202 is impermeable to the fluid and constituents of the fluid. The seam 204 joins a first part region 208 of the film 202 to a second part region 210 of the film 202. The seam 204 is realized in a fluid-tight manner and forms the film 202 into a fluid-tight bag 212 for receiving the fluid. The bag 212 is realized for the purpose of being arranged in chamber of a device for providing a fluid for a biochemical evaluation unit, as is shown in FIG. 1. The predetermined breaking point 206 is realized so as to be irreversibly destructible. The predetermined breaking point 206 is realized from the film 202 and is fluid-tight when a fluid pressure of the fluid in the film bag 200 is less than a limit value. The predetermined breaking point 206 is destroyed when the fluid pressure is greater than the limit value. The predetermined breaking point 206 can be realized as a peel seam.

The approach put forward here enables the inclusion—with long-term stability—of easily volatile fluids or substances, such as, for example, alcohols, in a LOC platform and the possibility of processing them further in the system in an automated manner, that is without the manual filling that is usual today. A high degree of design freedom is achieved above all as a result of using a pneumatic actuating means, as the opening force (the pressure) can be distributed in an arbitrary manner on the LOC. As a result of a sealing coating that is selectable independently of the materials of the LOC system (inside coating of the blisters 212 and bags 212), it is also possible to adapt the same in particular for sensitive substances such as enzymes such that no interactions occur and/or long-term stability is achieved.

The film 202 for diffusion-tight packing comprises a 3-layered design. In the interior there is an adhesive polymer layer which consists predominantly of polyethylene and is welded to itself in a thermal process. The adhesive seam 204 is the only remaining diffusion path, but on account of its minimal thickness of only a few micrometers and its width of typically more than 2 mm, achieves a very high level of tightness. The actual diffusion barrier is provided by the central layer produced from metal (preferably aluminum)

which can be designated from a thickness of approximately 12 μm as pinhole-free and consequently diffusion-tight. The outer polymer layer provides the mechanical stability. Films with said design enable blisters 200 or very small tubular bags 200 with a high level of tightness. The binding force can be set and adapted to the boundary conditions of the opening mechanism as a result of the temperature of the sealing process. In addition, it is also possible to use the geometry of the sealing seams 204, 206, e.g. as a result of the V-shaped characteristic at a freely selectable angle for adapting the opening procedure. A preferred side 206 for the opening of very small tubular bags 200 can be achieved as a result of the seam form, seam width and different sealing temperatures.

Figure 3:
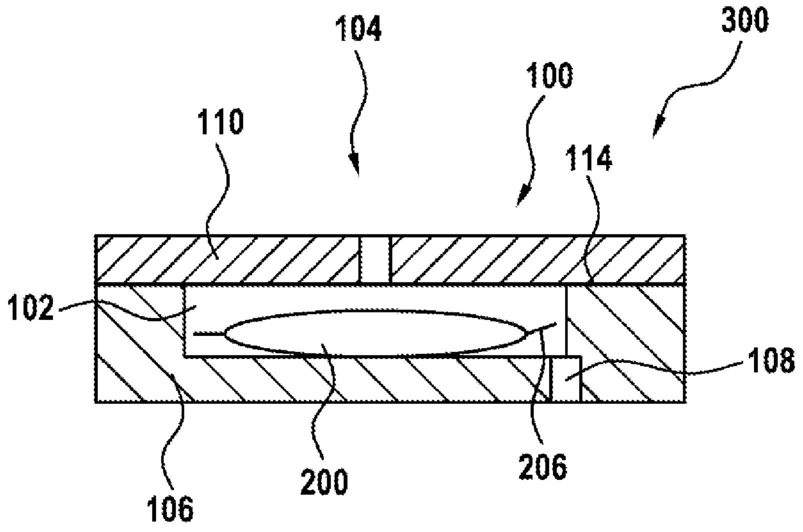
FIG. 3 shows a representation of a system for providing a fluid for a biochemical evaluation unit according to an exemplary embodiment of the present disclosure.

FIG. 3 shows a representation of a system 300 for providing a fluid for a biochemical evaluation unit according to an exemplary embodiment of the present disclosure. The system 300 comprises a device 100 for providing a fluid, as is shown in FIG. 1, and a film bag 200 for storing the fluid, as is shown in FIG. 2. The film bag 200 is arranged in the chamber 102 of the device 100. The chamber 102 is closed in a fluid-tight manner by means of the cover 110. The predetermined breaking point 206 of the film bag 200 is arranged in the region of the interface 108. The predetermined breaking point 206 can be realized as a part region of the seam 204. As in FIG. 1, the device 104 for opening is integrated in the cover 110. The system 300 is shown in a non-used state, i.e. the diaphragm 114 is non-deformed and the film bag 200 is sealed in a fluid-tight manner and filled with the fluid. The film bag 200 is arranged centrally in the chamber 102. There is a gap around the film bag 200 between the basic body 106 and the film bag 200.

The blisters 200 or bags 200 are inserted into a pre-formed compartment 102 of the LOC system which is defined on at least one side by an distensible film 114, e.g. produced from a thermoplastic elastomer. As a result of preferably deflecting the elastic film 114 in a pneumatic manner and as a result of the counterforce of the rigid insert form 106, a compressive load is exerted onto the blister 200 or bag 200 which results in making the predetermined breaking point 206 burst. As an alternative to this, the draining can also be achieved by means of a mechanical punch which presses onto the elastic film 114. This is meaningful, above all, in the case of very small volumes where the necessary opening pressure cannot be achieved pneumatically.

In other words, FIG. 3 shows a schematic diagram of a fully-integrated reagent pre-storage means that is stable in the long-term for lab-on-a-chip systems with a tubular bag 200. Automated lab-on-a-chip (LOC) systems for diagnostic applications are becoming increasingly important, above all when rapid results are required, i.e. the typical run times using a central laboratory are not tolerable in order to receive prompt diagnoses concerning the health conditions of patients. In addition, LOC systems are constructed in a more user-friendly manner than standardized biochemical assays that have to be run manually and have been used up to now in diagnostics. LOC systems require fewer manual steps by the user. LOC systems are based on adapted and optimized diagnostic standard sequence protocols and provide disposable products which are produced in a cost-efficient manner from plastics materials. Standardized biochemical assays for diagnostics generally consist of several steps which are matched to one another and can be shown in a type of sequence plan. In a simplified manner, this is composed of the sample collection, the lysis of the sample, the purification, the replication and the subsequent detection. Along with various buffers, enzymes, primers, polymerases and DNA fragments for its operating sequence, also alcohols such as ethanol, butanol or alcohol-water or buffer compounds are required for said sequence plan. In this case, all reagents are pre-stored directly in the LOC system.

A result of storing at least the volatile reagents and auxiliary agents in film bags 200 according to the approach put forward here, the pre-storing of alcohols in LOC systems is particularly simple. On account of the diffusion-tight film of the film bag 200, the physico-chemical characteristics of alcohol, such as high vapor pressure and low boiling point and as a consequence a high permeation rate in plastics materials, do not represent a problem. A cross-contamination of adjacent reagents can be prevented in this manner. The enzymes pre-stored on the LOC platform are very sensitive in relation to interactions with alcohols. Their activity can be inhibited by alcohol, as a result of which the entire sequence plan could no longer be executed correctly and reliably. As a result of storing at least the alcohols in the tight film bags 200, plastic materials swelling up and, as a result, a change in the surface as well as the system 33 leaking can additionally be ruled out. As a result of a system for providing 300 according to the approach put forward here, alcohols can consequently be pre-stored directly in the LOC system and do not have to be supplied just before the start of the assay, which results in a clearly more user-friendly and less error-prone sequence.

The approach put forward here provides a solution that is stable in the long-term for pre-storing all the necessary reagents and auxiliary agents which can be involved in the fully automatic sequence of the evaluation unit, i.e. no more manual decanting or filling steps required. As a result the service life of the product is determined only by the length of the service life of the constituents, but no longer by the diffusing of the same into adjacent chambers or the environment. Releasing the reagents for the diagnostic sequence is possible by means of available actuator technology, e.g. compressed air. The system 300 for providing can be used, for example, in medical diagnostic instruments and disposable lab-on-chips for infection diagnostics.

Figure 4:
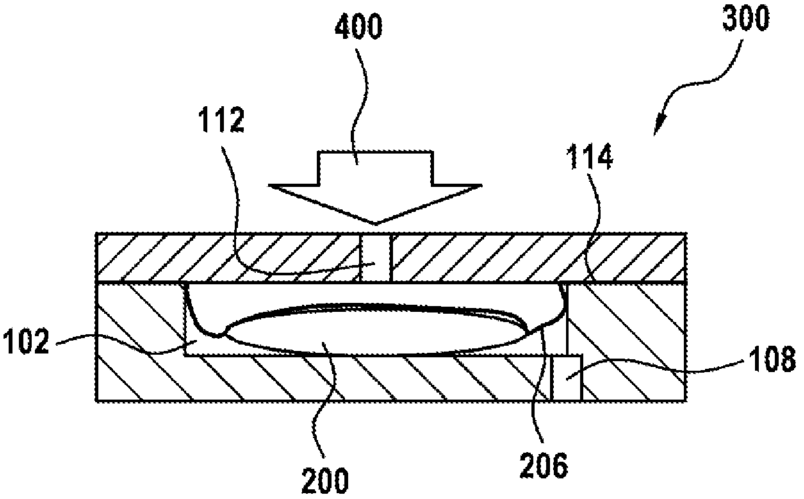
FIG. 4 shows a representation of a system for providing a fluid for a biochemical evaluation unit during actuation according to an exemplary embodiment of the present disclosure.

FIG. 4 shows a representation of a system 300 for providing a fluid for a biochemical evaluation unit during actuation according to an exemplary embodiment of the present disclosure. The system 300 corresponds to the system in FIG. 3. In contrast to FIG. 3, the diaphragm 114 is deformed as a result of introducing compressed air 400 through the air channel 112 into the chamber 102. The diaphragm 114 presses onto the film bag 200 and consequently increases an internal pressure in the film bag 200 until the film bag 200 bursts at the predetermined breaking point 206 and the fluid escapes out of the interface 108. The diaphragm 114 remains fluid-tight during the deforming. The deforming of the diaphragm 114 is plastically irreversible as the system 300 is designed for single use and is then disposed of after use.

Figure 5:
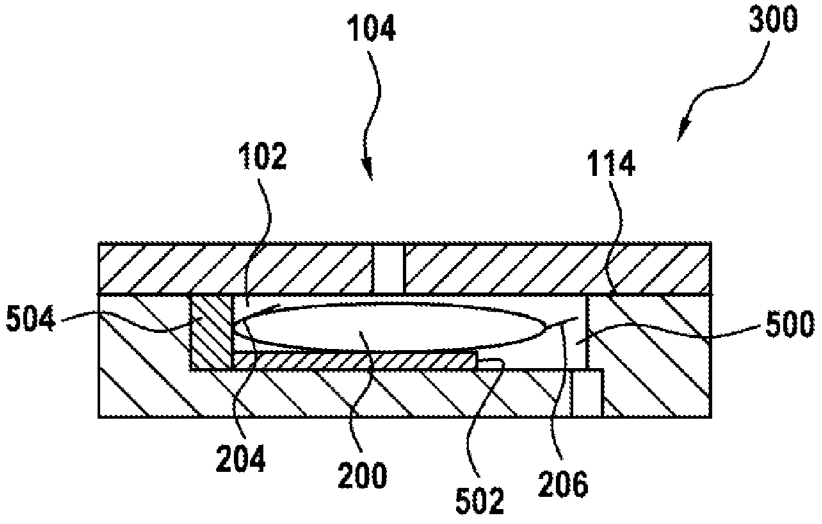
FIG. 5 shows a representation of a system for providing a fluid with a stepped bottom and folded-round seam according to an exemplary embodiment of the present disclosure.

FIG. 5 shows a representation of a system 300 for providing a fluid with an indentation 500 according to an exemplary embodiment of the present disclosure. The system 300, in this case, corresponds substantially to the system in FIG. 3. In addition to FIG. 3, the system 300 comprises a step 502 in the bottom of the chamber 102. The film bag 200 is arranged in such a manner on the step 502 that the predetermined breaking point 206 is arranged above the indentation 500. In addition, the film bag 200 is arranged eccentrically in the chamber 102. The sealing seam 204 on one side of the film bag 200 is folded up around or bent up around and rests on the film bag 200 in order to strengthen the seam 204 at this point. To this end, an insert part 504, which the seam 204 bends around and reduces the size of the chamber 102, has been brought into the chamber 102. When the device for opening 104 is now actuated, the diaphragm 114 then presses the film bag 200 flat initially in the region of the step 502. In the region of the indentation 500 the film bag 200 remains suspended freely such that the predetermined breaking point 206 is not pressed against the bottom of the chamber 102 by the diaphragm 114. To support the opening procedure of the bag 200, the form of the insert 106 can be realized in a step-shaped manner, as a result of which the opening procedure is improved. In the case of tubular bags 200, the side which is not to be opened can be protected additionally against unwanted opening by folding over the sealing seam 204.

Figure 6:
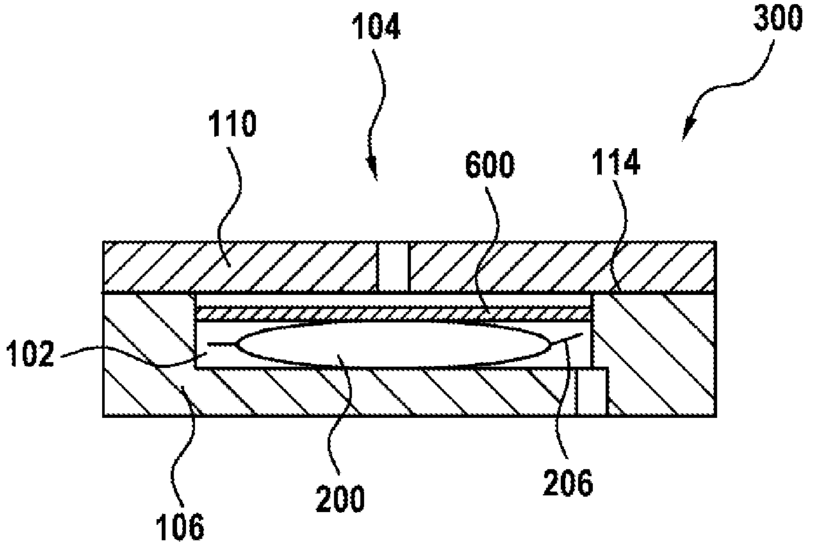
FIG. 6 shows a representation of a system for providing a fluid with a pressure plate according to an exemplary embodiment of the present disclosure.

FIG. 6 shows a representation of a system 300 for providing a fluid with a pressure plate 600 according to an exemplary embodiment of the present disclosure. The system 300, in this case, corresponds substantially to the system in FIG. 3. In addition to FIG. 3, the system 300 comprises a pressure plate 600 in the chamber 102. The pressure plate 600 is arranged so as to be movable inside the chamber 102. The pressure plate 600 can be moved up and down. The pressure plate 600 is arranged between the diaphragm 114 and on the film bag 200. When the device for opening 14 is actuated, the diaphragm 114 presses on the pressure plate 600 over a large area. The pressure plate 600 then acts as a rigid piston and concentrates the pressing force onto the film bag 200. The film bag 200 is squeezed between the pressure plate 600 and the basic body 106. As a result, the inside pressure in the film bag 200 can be increased in a particularly efficient manner until the predetermined breaking point 206 bursts. The pressure plate 600 is then moved in a straight line from the cover 110 to the bottom of the chamber 102 and makes it possible for the film bag 200 to be drained completely through the interface 108. The pressure of the elastic diaphragm 114 onto the sealing seam 204 can be reduced by means of the insert plate 600, as a result of which the opening procedure is improved.

Figure 7:
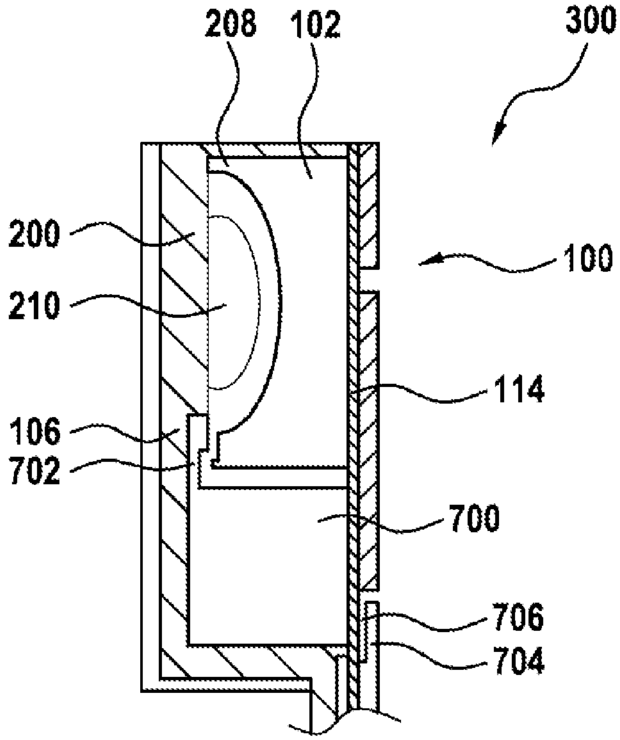
FIG. 7 shows a representation of a system for providing a fluid with a re-positioning chamber according to an exemplary embodiment of the present disclosure.

FIG. 7 shows a representation of a system 300 for providing a fluid with a repositioning chamber 700 according to an exemplary embodiment of the present disclosure. The system 300, in this case, corresponds substantially to the system in FIG. 3, but is shown rotated by 90°. As in FIG. 3, the system 300 comprises a device 100 for providing and a film bag 200 for storing. The film bag 200 is asymmetrically developed in this exemplary embodiment. The film bag 200 is realized as an aluminum polymer composite film blister 200. The first part region 208 of the film 202 is larger than the second part region 210. As a result, the film bag 200 comprises the form of a drop of liquid on a horizontal plane with partial moistening. The foil bag 200 is fastened on the bottom of the chamber 102. The device 100 corresponds extensively to the device in FIG. 1. In addition, a channel 702 connects the chamber 102 to the repositioning chamber 700. The chamber 102 is separated from the repositioning chamber 700 by a wall. The repositioning chamber 700 is arranged below the chamber 102. The predetermined breaking point 106 is arranged in the region of an inlet to the channel 702. The repositioning chamber 700 comprises a controllable valve 704 which is realized as the interface to the biochemical evaluation unit. When the fluid, in response to the actuating of the device 104 for opening, has been pressed out of the film bag 200 by means of pneumatics through the channel 702 into the repositioning chamber 700, the fluid can be provided by means of the valve 704, driven by gravity, in a dosed manner. In said exemplary embodiment, the valve 704, whilst using the same diaphragm 114 as the device 104 for opening, is realized from TPE, for example. The valve 704 comprises an own control channel 706 through which, for example, a negative pressure can deflect the diaphragm 114 in order to release the valve 704 (the interface) in a targeted manner to a channel into the system in response to a PC or fluidics. The reagents contained in the film bag 200 can be repositioned almost completely into the providing chamber 700 as a result of being pressed out pneumatically.

Figure 8A:
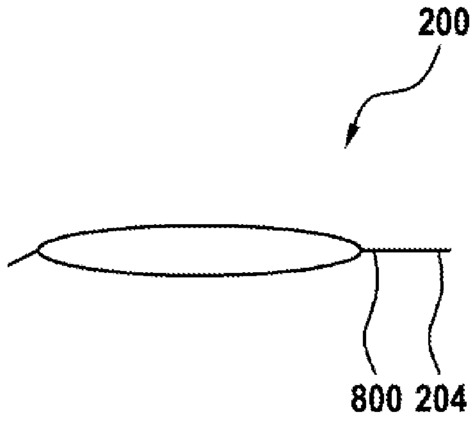
FIG. 8A shows a cross sectional representation of a film bag for storing a fluid with a further seam according to an exemplary embodiment of the present disclosure.

FIG. 8A shows a representation of a film bag 200 for storing a fluid with a further seam 800 according to an exemplary embodiment of the present disclosure. The film bag 200, in this case, corresponds to the film bag in FIG. 2. In addition to the standard sealing 204, the further seam 800 has been applied as subsequent sealing to the filled film bag 200 in order to reduce an inside volume of the film bag 200. As a result, the film bag 200 is firmer and is under a vacuum. The further seam 800 is arranged parallel to a seam 204. For example, the further seam 800 can be arranged next to a bottom seam 204 or a cover seam 204 of the film bag 200. In particular, the further seam 800 can be arranged opposite the predetermined breaking point when the predetermined breaking point is realized as a region of the seam 204 as the film bag 200 is particularly stable in the region of the further seam 800. Two-step sealing (subsequent sealing) of the tubular bag 200 to increase the "firmness" also improves the opening procedure. The generating of a predetermined breaking point 206 can also be effected by means of lasers by partially removing the outer polymer layer.

Figure 8B:
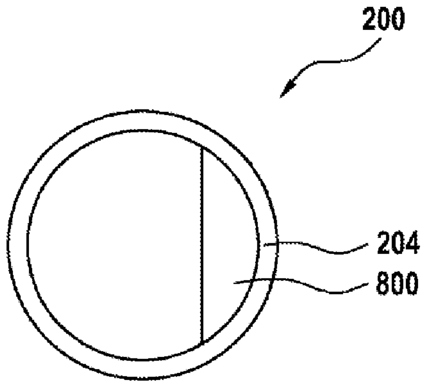
FIG. 8B shows a top view representation of the film bag for storing a fluid with the further seam according to an exemplary embodiment of the present disclosure.

FIG. 8B shows a top view representation of the film bag constructed according to FIG. 8A for storing a fluid with the further seam.

Figure 9A:
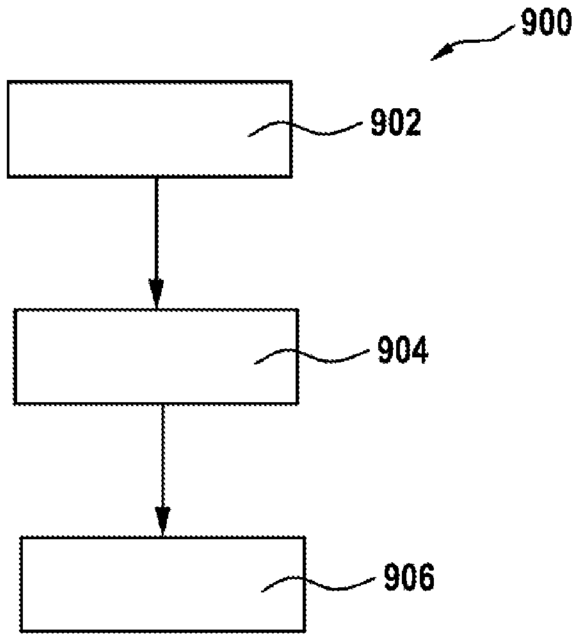
FIG. 9A shows a flow diagram of a method for producing a fluid-filled film bag according to an exemplary embodiment of the present disclosure.

FIG. 9A shows a flow chart of a method 900 for producing a fluid-filled film bag according to an exemplary embodiment of the present disclosure. The method 900 comprises a step 902 of providing, a step 904 of filling and a step 906 of closing. In the step 902 of providing, a film bag is provided for storing a fluid, as is shown for example in FIG. 2. The bag comprises a fill opening. In the step 904 of filling, the bag is filled with the fluid through the fill opening. In the step 906 of closing, the fill opening of the film bag is closed by way of a seam in order to seal the film bag.

Figure 9B:
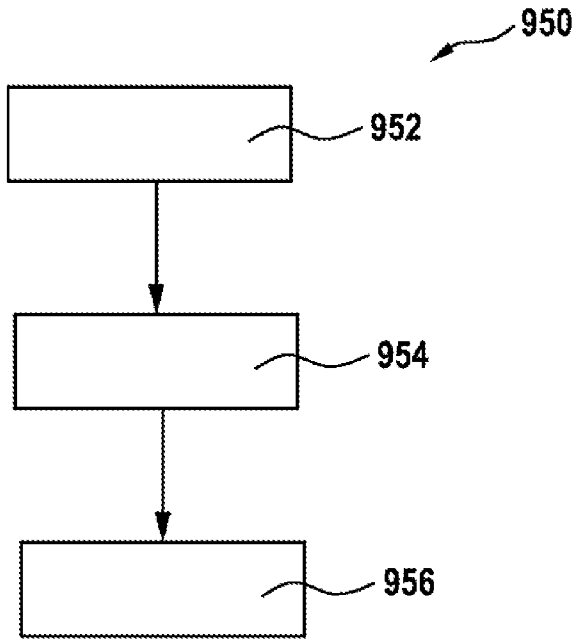
FIG. 9B shows a flow diagram of a method for producing a system according to an exemplary embodiment of the present disclosure.

FIG. 9B shows a flow chart of a method 950 for producing a system 300 according to an exemplary embodiment of the present disclosure. The method 950 includes a step 952 of providing a fluid bag according to a variant put forward here and a device 100 for providing a fluid for a biochemical evaluation unit according to a variant put forward here. In addition, the method 950 includes a step 954 of introducing the fluid bag 200 into the chamber 102 of the device 100 and a step 956 of closing the device 100 in order to produce the system 300 for providing the fluid for a biochemical evaluation unit.

The reagents are enclosed in blisters or very small tubular bags (stick-packs) which are as shown in FIGS. 2 and 8 and consist of diffusion-tight composite film. This means that loss-free, almost temperature-independent long-term storage is made possible. Along with the low costs, said packing method 900 also provides the possibility of meeting the high demands for sterilization as well as packing the reagents under an inert protective gas atmosphere. The blisters or bags have a predetermined breaking point which can be realized, for example, in the form of a peel seam. The opening procedure (opening pressure) of the peel seam can be adapted to the demands by means of a temperature during the production of the seam, a geometry of the sealing seam, an adhesive coating of the film and/or a level of filling of the film bag.

Figure 10:
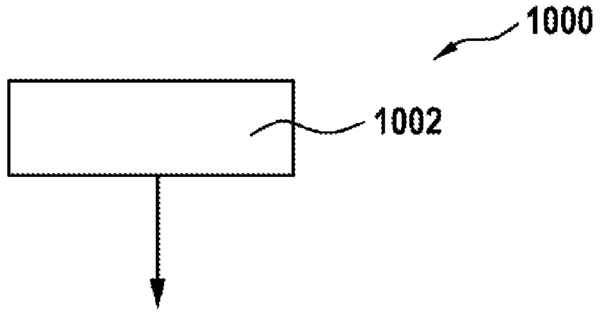
FIG. 10 shows a flow diagram of a method for opening a fluid-filled film bag according to an exemplary embodiment of the present disclosure.

FIG. 10 shows a flow chart of a method 1000 for opening a fluid-filled film bag according to an exemplary embodiment of the present disclosure. The method 1000 comprises a step 1002 of applying. In the step 1002 of applying, a force is applied onto a part region of the film bag in order to increase an inside pressure of the foil bag in relation to atmospheric pressure until a predetermined breaking point of the foil bag tears on account of the inside pressure in order to open the foil bag.

The opening of the blisters or bags can be effected by means of an external force which, for example, can be effected pneumatically by means of an elastic diaphragm or by means of mechanical punch actuators. As a result, the stored liquid is repositioned into a providing chamber of the lab-on-a-chip system.

Figure 11:
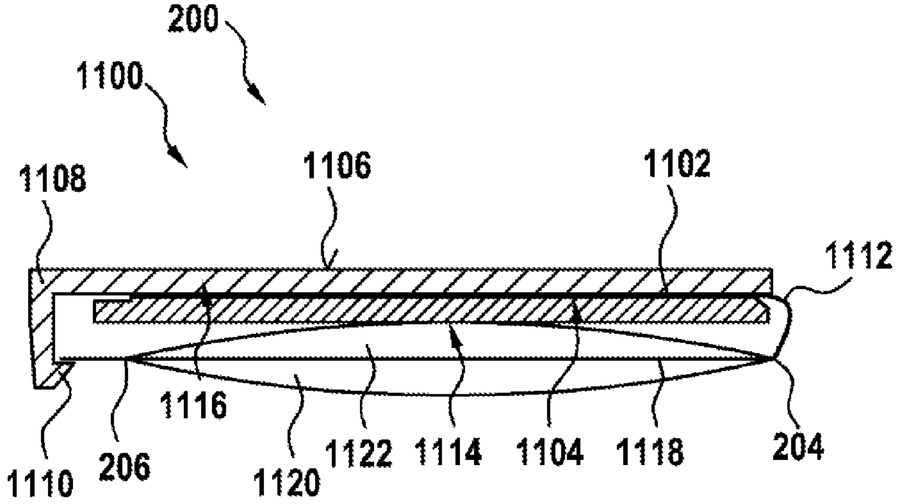
FIG. 11 shows a representation of a film bag for storing a fluid with an additional element according to an exemplary embodiment of the present disclosure.

FIG. 11 shows a representation of a film bag 200 for storing a fluid with an additional element 1100 according to an exemplary embodiment of the present disclosure. The film bag 200 corresponds to the film bag in FIG. 2 or FIG. 8. In addition, the film bag 200, opposite the predetermined breaking point 206 as an extension of the seam 204, comprises a lengthened film continuation 1102 which is connected to the additional element 1100. In said exemplary embodiment, the additional element 1100 comprises a clamping region 1104 in which the film continuation 1102 is fastened. In the clamping region 1104, the film continuation 1102 is clamped between two clamping wings which fix the film continuation 1102 in a secure manner. The additional element 1100 comprises a plate-like pressing face 1106 and a continuation 1108 which is angled thereto. A latching lug 1110 is arranged on the continuation 1108. The film continuation 1102 is bent around at a bend point 1112 such that the additional element 1100 abuts against the bag 212 in a pressure region 1114 by way of the pressing face 1106. The continuation 1108 surrounds the film bag 200 in part. The predetermined breaking point 206 is latched in the latching lug 1110 such that the bag 212 is held abutting against the pressure region 1114 and is consequently simple to handle. The pressing surface 1106 is realized for the purpose of concentrating the pressure onto the pressure region 1114 of the film bag 200 (stick-pack) when actuating the device for opening so that the predetermined breaking point 206 bursts in a reliable manner. The continuation 1108 is realized for the purpose of protecting the predetermined breaking point 206 so that when the device for opening is actuated, the predetermined breaking point 206 cannot be squeezed. The pressing face 1106 additionally comprises handling faces 1116 for an automatic gripper so that the film bag can be moved and processed fully automatically during production and additionally inserted fully automatically in the device for providing. In said special exemplary embodiment, the bag 212 comprises an intermediate layer 1118 which separates the bag 212 into a first chamber 1120 for storing a first fluid and a second chamber 1122 for storing a second fluid. The intermediate layer 1118 is arranged in this case centrally in the bag 212 such that the first chamber 1120 and the second chamber 1122 are the same size. When the predetermined breaking point 206 is destroyed, the first fluid is mixed with the second fluid.

In other words, FIG. 11 shows the structural realization of an additional element 1100 for reliably opening the bags 200 and blisters 212 in LOC (lab-on-a-chip) cartridges.

Figure 14:
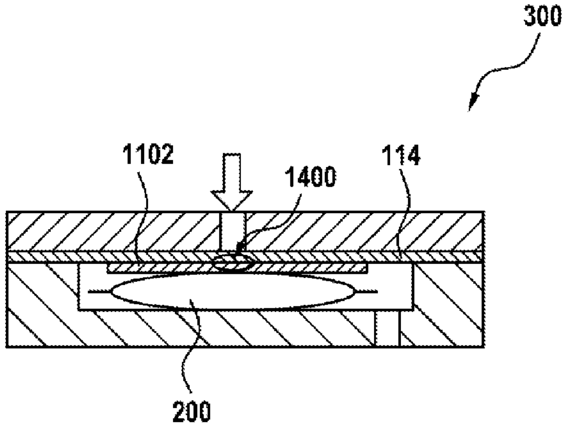
FIG. 14 shows a representation of a system for providing a fluid with a fastened pressure plate according to an exemplary embodiment of the present disclosure.

The additional element 1100 consists of plastics material, metal or other materials also being possible, and is formed with film hinges. As a result of the film hinges, the bag 212 is able to be clamped on the seam 204 and consequently held securely, bonding or welding also being possible as connecting alternatives. The additional element 1100 is formed in a corresponding manner so that when the elastic diaphragm is pressed, the pressure is applied onto the middle of the bag 212 and the bag 212 is squeezed in a defined manner. The additional element 1100 is formed on the bottom surface such that it is even except in the region of the predetermined breaking point 206 (peel seam) in order to drain the flexible bag 212 almost completely. The characteristic of the approach put forward here is that the additional element 1100 is fastened either on the bag 212 as shown in FIG. 11 or can be mounted on the diaphragm as shown in FIG. 14. As a result of a structural molding 1108, the region of the predetermined breaking point 206 is not acted upon with pressure such that it is able to burst as a result of the pressure onto the bag 212 and the liquid is drained in a defined manner. The peel seam 206 comprises a chamber 1110 for the peel seam 206 for reliably opening the seam 206. The bag 212 is fastened on the additional element 1100 by means of a clamping mechanism 1104.

The additional element 1100 is formed such that the flexible bag 212 is received completely and the outside dimensions are determined primarily by the element 1100. The additional element 1100 has a stop edge 1110 such that the bag 212 is always fixed in the same manner in relation to the additional element 1100. The additional element 1100 comprises handling faces 1116 for the automatic assembly with grippers.

Figure 12:
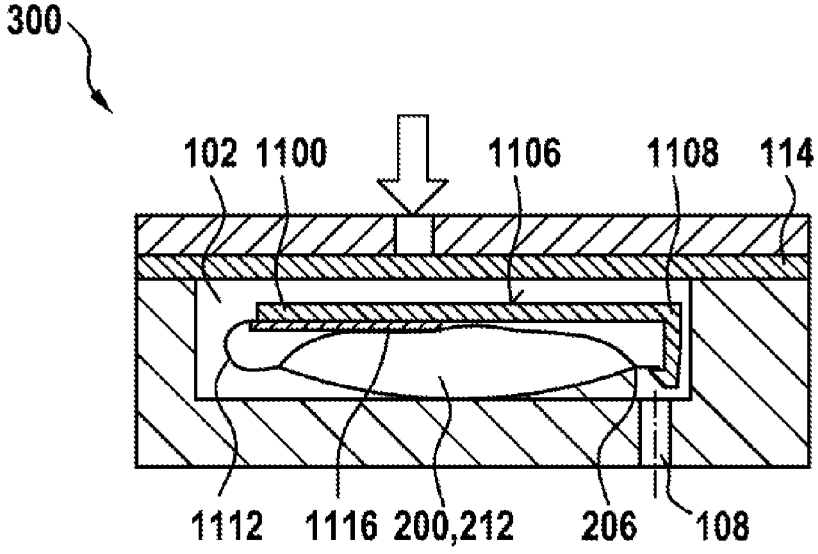
FIG. 12 shows a representation of a system for providing a fluid with a film bag with an additional element according to an exemplary embodiment of the present disclosure.

FIG. 12 shows a representation of a system 300 for providing a fluid with a film bag 200 with an additional element 1100 according to an exemplary embodiment of the present disclosure. The system 300 corresponds to the system in FIG. 3. The film bag 200 corresponds to the film bag in FIG. 11. The film bag 200 is arranged in the chamber 102. The pressing face 1106 is arranged facing the diaphragm 114. The continuation 1108 and the predetermined breaking point 206 are arranged above the interface 108. When the diaphragm 114 is pressed into the chamber 102, the diaphragm 114 presses evenly onto the pressing face 1106. The pressing face 1106 concentrates the pressing force onto the pressure region 1116 in order to make the predetermined breaking point 206 burst. The continuation 1108 supports the additional element 1100 on one side on the bottom of the chamber 102. As a result, the additional element 1100 tips over on the side of the bend point 1112 until it also abuts against the bottom. The bag 212 is then pressed flat from the side of the bend point 1112 by the pressing face 1106 and is consequently squeezed out in the direction of the interface 108. The continuation 1108 ensures in this case that the predetermined breaking point 206 cannot be squeezed by the diaphragm 114 and the interface 108 cannot be closed during the entire operation.

In the case of lab-on-a-chip products (LOC) or so-called microfluidic platforms (μTAS), medical and biological liquids are processed on a carrier and patient samples are consequently analyzed for the presence of pathogens and bacteria. Lab-on-a-chip platforms can be constructed as so-called cartridges which receive and process the patient sample as a disposable article. Liquids, which can either be stored on the cartridge or added subsequently for the sequence by the operator, are required for the process sequence on the cartridge.

The approach put forward here describes storing the liquids in blisters 200 or bags 212 inside the cartridge. The bags 212 can be opened by an external force. The opening pressure, in this case, is introduced by means of an elastic diaphragm 114. The diaphragm 114 is either pneumatically deflected or moved by means of a plunger. A separate diagnostic unit (DxU) either generates the compressed air for pneumatic actuation or includes the movable plungers which press onto the diaphragm 114. Without the additional element 1100 put forward here, the site of the introduction of force into the flexible bag 212 can be non-defined and result in a large spread in the case of the opening pressure. The diaphragm 114 can close the predetermined breaking point 206 in part and robust squeezing of the bag 212 could be prevented. In addition, the bags 212 and/or stick-packs can comprise unfavorable geometric dimensions such that the outside dimensions of the cartridge are able to increase when the bags 212 are installed.

Figure 13:
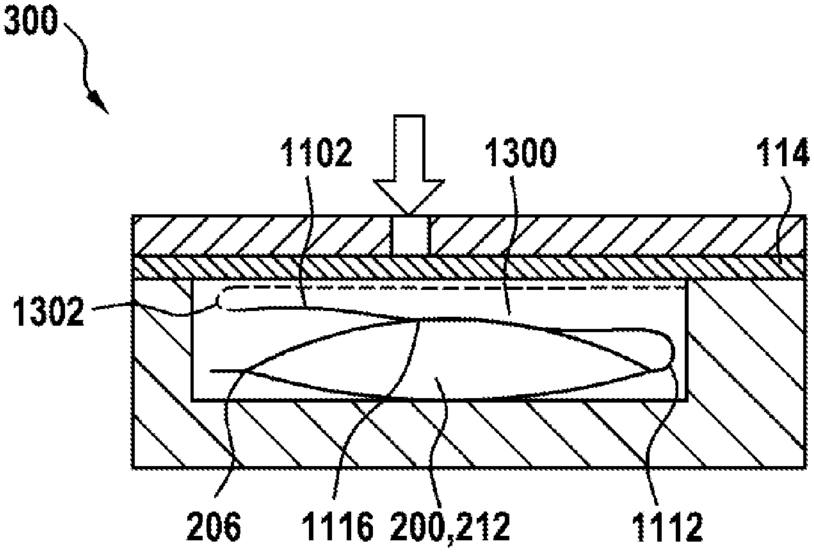
FIG. 13 shows a representation of a system for providing a fluid with a film bag with an additional element produced from film according to an exemplary embodiment of the present disclosure.

As a result of the additional element 1100, which is shown in FIGS. 11 and 13, is connected to the stick-pack 212 and is integrated into the chamber 102, robust opening of the bag 212 can be ensured. In this case, a precise pressing force can be introduced onto the bag 212 at a defined position 1116 when actuated by the diagnostic instrument. Unintended opening of the bag 212 when the cartridge is being transported can also be avoided. Handling in the automatic production of the flexible bag 200 can also be improved as a result of the additional element 1100. The outside dimensions of the flexible bag 200 can be advantageously adapted as a result of the rigid element 1100, as a result of which space-saving installation inside the cartridge is possible.

A rigid additional element 1100 is mounted onto the blisters/bags 212. The force is introduced onto the stick-pack 212 at a defined point 1116 as a result of the additional element 1100. This reduces the opening force and avoids the predetermined breaking point 206 being pressed closed. The opening force, which is provided by the external operating unit, can be reduced. The bags 212 open in a robust manner when actuated by the operating unit and unintended opening during transport and storage is avoided. The quality of the LOC system 300 is increased. The additional element 1100 compresses the complete bag 212, as a result of which the contents of the entire bag 212 are drained. Residues of the reagents in the bag 212 are consequently avoided. Precisely expensive reagents can be used more efficiently by the additional element, as a result of which a cost advantage is created. The form of the stick-pack 200 can be adapted by the additional element 1100 and the additional element 1100 and the stick-pack 200 are able to be installed in a smaller and more flexible manner inside the cartridge. The cartridge dimensions are reduced, as a result of which further cost advantages are created. The additional element 1100 makes it possible to mount the flexible bag 212 automatically. Automatic grippers can grip the unit 200 made up of the bag 212 and the additional element 1100 in a defined manner and insert it into the cartridge. This produces a reduction in cycle time and a reduction in costs.

FIG. 13 shows a representation of a system 300 for providing a fluid with a film bag 200 with an additional element 1300 made up by film 1300 according to an exemplary embodiment of the present disclosure. The system 300 corresponds to the system in FIG. 3. The film bag 200 comprises, as in FIG. 11, a film continuation 1102. In contrast to FIG. 11, the film continuation 1102 in this case is realized directly as the additional element 1300. To this end, the film continuation 1102 is realized in a reinforced manner. The additional element made up of film 1300 extends in a first embodiment from the bend point 1112 over an entire length of the bag 212 up to the predetermined breaking point 206. In a second embodiment, the additional element made up of film 1300 comprises a further bend point 1302 in the region of the predetermined breaking point 206 and extends once again over the entire length of the bag 212 back up to the bend point 1112. As a result of the reinforcement, when the device is actuated, the additional element made up of film 1300 concentrates the pressing force of the diaphragm 114 onto the pressure region 1116 in order to make the predetermined breaking point 206 burst.

FIG. 13 shows a further type of realization where the integration of the additional element 1300 in the stick-pack 200 itself is shown. To this end, the fixed seal side (opposite the peel seam 206) is formed to be so long that by folding over once or multiple times it acts, itself, as an additional element 1300 which releases the peel seam. The layers can be bonded for mechanical strength when folded over multiple times. For handling the arrangement 200 in a simpler manner, the tab can also be fixed to the stick-pack 200 by means of bonding. The solid line shows the single version of the integrated additional element and the dotted line shows the double version.

FIG. 14 shows a representation of a system 300 for providing a fluid with a fastened pressure plate 600 according to an exemplary embodiment of the present disclosure. The system 300 corresponds to the system in FIG. 6. The pressure plate 600 in this case takes on the function of the additional element and is fixed on the elastic diaphragm 114. In addition to the representation in FIG. 6, the pressure plate 600 is connected to the diaphragm 114 at a bond point 1400. As a result, the pressure plate 600 is held in a predetermined position and, when the device is actuated, the fluid is pressed out of the film bag 200 under controlled conditions.

The exemplary embodiments described and shown in the figures are only chosen as examples. Different exemplary embodiments can be combined together completely or with reference to individual features. One exemplary embodiment can also be supplemented by features of a further exemplary embodiment.

In addition, method steps according to the disclosure can be repeated and carried out in a sequence other than in the described sequence.

If an exemplary embodiment includes an "and/or" link between a first feature and a second feature, this is to be read as the exemplary embodiment according to one embodiment comprising both the first feature and the second feature and according to a further embodiment comprising either just the first feature or just the second feature.

The invention claimed is:

1. A film bag for storing a fluid, comprising:

a film that is impermeable to the fluid and constituent parts of the fluid, the film having a first part region and a second part region;

a seam arranged between the first part region of the film and the second part region of the film, the seam configured in a fluid-tight manner such that the first part region of the film and the second part region of the film are formed into a fluid-tight bag configured to receive the fluid, the fluid-tight bag configured to be arranged in a chamber of a device configured to provide the fluid for a biochemical evaluation unit;

a film continuation extending from the seam and spaced apart from the fluid-tight bag; and an additional element fastened on the film continuation and defining a bend point around which the film continuation is bent, the additional element configured to be pressed onto the fluid-tight bag in order to increase a fluid pressure in the fluid-tight bag, wherein the film defines an irreversibly destructible predefined breaking point that is (i) fluid-tight when the fluid pressure in the film bag is less than a limit value and (ii) destroyed when the fluid pressure in the film bag is greater than the limit value, and wherein the film continuation extends from a side of the seam remote from a center of the fluid-tight bag.

2. The film bag as claimed in claim 1, wherein the film has a multi-layered configuration with a central layer that includes a metal film or consists of a metal film.

3. The film bag as claimed in claim 1, wherein the predefined breaking point is configured as a portion of the seam and the seam comprises at least one V-shaped characteristic in the region of the predetermined breaking point.

4. The film bag as claimed in claim 3, wherein the film bag is filled with alcohol.

5. The film bag as claimed in claim 1, wherein the seam is one or more of folded around and bent around in the direction of a center of the fluid-tight bag.

6. The film bag as claimed in claim 1, wherein a further seam is arranged at least in a part region of the seam next to the seam, in the direction of a center of the fluid-tight bag, in order to reduce a volume that is surrounded by the fluid-tight bag.

7. The film bag as claimed in claim 1, wherein the additional element comprises a continuation that protrudes on a side located opposite the bend point out of a main extension plane of the additional element and is configured to surround the predetermined breaking point at least in part when the additional element is bent pressed onto the fluid-tight bag.

8. The film bag as claimed in claim 1, wherein the fluid is a reagent or an auxiliary agent for a biochemical analysis method.

9. A method for producing a fluid-filled film bag, the bag including a fill opening, the fluid bag including a film that is impermeable to the fluid and constituents of the fluid, comprising:

forming a first part region of the film and a second part region of the film into a fluid-tight bag;

filling the fluid-tight bag with the fluid through the fill opening;

closing the fill opening of the fluid-tight bag by sealing the fluid-tight bag at a seam located between the first part region and the second part region of the film; and forming a film continuation extending from the fluid-tight bag on a side of the seam remote from a center of the fluid-tight bag;

fastening an additional element defining a bend point on the film continuation, wherein the fluid-tight bag is configured to be arranged in a chamber of a device configured to provide the fluid for a biochemical evaluation unit, wherein the film defines an irreversibly destructible predetermined breaking point that is (i) fluid-tight when a fluid pressure in the film bag is less than a limit value and (ii) destroyed when the fluid pressure in the film bag is greater than the limit value, and wherein the additional element is configured to be pressed onto the fluid-tight bag in order to increase the fluid pressure in the fluid-tight bag.

10. The method as claimed in claim 9, wherein the chamber of the device includes an interface configured to provide the fluid for the evaluation unit, the device further including an opening device configured to open the predetermined breaking point of the film in order to provide the fluid at the interface, the method further comprising:

moving the fluid-tight bag into the chamber of the device; and closing the device in order to produce a system for providing the fluid for the biochemical evaluation unit.

* * * * *